United States Patent
Leckel et al.

(10) Patent No.: US 6,538,778 B1
(45) Date of Patent: Mar. 25, 2003

(54) OPTICAL COMPONENT TESTER

(75) Inventors: Edgar Leckel, Jettingen (DE); Helmut Sennewald, Herrenberg (DE); Carsten Suess, Gerlingen (DE)

(73) Assignee: Agilent Technologies, Inc., Palo Alto, CA (US)

( * ) Notice: Subject to any disclaimer, the term of this patent is extended or adjusted under 35 U.S.C. 154(b) by 0 days.

(21) Appl. No.: 09/294,555

(22) Filed: Apr. 20, 1999

(30) Foreign Application Priority Data

Apr. 21, 1998 (EP) .............................................. 98107197

(51) Int. Cl.[7] .............................................. H04B 10/08
(52) U.S. Cl. ...................................... 359/110; 359/161
(58) Field of Search ................................ 359/110, 132, 359/161, 187; 250/227.23, 227.18; 356/73.1

(56) References Cited

U.S. PATENT DOCUMENTS

| | | | | |
|---|---|---|---|---|
| 4,664,522 A | * | 5/1987 | LeFebre | 356/328 |
| 4,875,859 A | * | 10/1989 | Wong et al. | 434/214 |
| 5,069,544 A | * | 12/1991 | Buerli | 356/73.1 |
| 5,179,420 A | * | 1/1993 | So et al. | 356/73.1 |
| 5,357,333 A | * | 10/1994 | DeBernardi et al. | 356/73.1 |
| 5,515,169 A | | 5/1996 | Cargill et al. | 356/417 |
| 5,644,417 A | * | 7/1997 | Aulet et al. | 359/110 |
| 5,696,707 A | * | 12/1997 | Hentschel et al. | 364/574 |
| 5,825,530 A | * | 10/1998 | Leckel et al. | 359/333 |
| 6,023,358 A | * | 2/2000 | Baney | 359/110 |
| 6,067,150 A | * | 5/2000 | Beller et al. | 356/73.1 |

FOREIGN PATENT DOCUMENTS

| EP | 0 453 176 | 10/1991 |
|---|---|---|
| EP | 0 548 935 | 6/1993 |

* cited by examiner

*Primary Examiner*—Leslie Pascal
*Assistant Examiner*—Hanh Phan

(57) ABSTRACT

Disclosed is an optical component tester for determining the wavelength dependent characteristics of an optical component. The tester comprises as functional units a tunable laser source for providing a stimulus signal to the optical component and one or more response units for receiving a response of the optical component on the stimulus signal; The tester further comprises a control unit coupled to the functional units for controlling the functioning thereof. The control unit preferably comprises a microcontroller connected to a signal processor, whereby the signal processor is connected to the functional units and responsible for processing all timing critical operations within the tester.

19 Claims, 2 Drawing Sheets

OPTICAL COMPONENT TESTER

BACKGROUND OF THE INVENTION

The present invention relates to the determining of the wavelength dependent characteristics of an optical component.

Different requirements have to be met for measuring optical components, generally depending on the type of component and its spectral bandwidth. A pump coupler at the input of an optical amplifier, for example, may have a spectral bandwidth of 50 nm or more, whereas a Wavelength-Division-Multiplexing (WDM) de-multiplexer may have a spectral bandwidth of only 0.2 nm for each of its channels. In particular modem optical devices, such as WM or Dense-WDM (DWDM) devices, may provide one input and multiple outputs where each output has a different wavelength passband characteristics. A measurement of such a device often demands several thousand points per output to achieve the required characteristic, with one powermeter per output which have to obtain the measurement points synchronously.

Known measurement setups (cf. e.g. in "Fiber optic test and measurement" by Dennis Derickson ISBN 0-13-534330-5, pages 358–382) for characterizing wavelength dependent optical components are normally based on a tunable laser source in combination with a wavelength meter, a tracking filter and an optical power meter (loc. cit. page 360) and connected via standard interfaces (e.g. HPIB). Instead of using a tunable laser source, a broadband light source can be applied in combination with an optical spectrum analyzer (loc cit. page 368f), however, with a limited resolution bandwidth (approximately 0.1 . . . 0.05 nm) in contrast to the tunable laser sources (approximately $10^{-6}$ nm).

EP-A-453 176 discloses an optical fault finder which optimizes the pulse width of the test signal which is transmitted through an optical fiber. The fault finder is an optical time domain reflectometer (OTDR) having a laser source for providing a stimulus signal and a response unit for receiving a response on the stimulus signal. Both, the laser source and the response unit are controllable by a micro-processor.

EP-A-548 935 discloses an apparatus for measuring the effective refractive index in optical fibers. The apparatus comprises a tunable laser source for providing a stimulus signal to the optical component and a receiver for receiving a response of the optical component on the stimulus signal. A control unit is coupled to the tunable laser source and the receiver for controlling the functioning thereof.

U.S. Pat. No. 5,644,417 discloses an automated system for measuring transmitter data dependent jitter of electro-optic modules. The system comprises a laser source, a receiver for receiving responses on the laser signals, and a PC for controlling the system.

U.S. Pat. No. 4,664,522 discloses an optical waveguide spectrum analyzer receiving light from an external source diffracting at a grating to a pair of detectors. Data from the detectors is processed and analyzed by a computer.

Disadvantageous in either one of the known measurement setups is that those often highly complex and expensive setups are generally limited in either measurement speed, or accuracy, or even in both, and are thus not applicable or sufficient for characterizing modem optical components.

SUMMARY OF THE INVENTION

It is an object of the invention to provide an improved measuring setup for characterizing wavelength dependent optical components.

This is solved by an optical component tester and a corresponding method for determining the wavelength dependent characteristics of an optical component according to the independent claims. Further advantageous embodiments can be found in the dependent claims.

The invention provides a separation of operations within the tester into timing critical and timing non-critical operations, thus improving the processing speed and the timing behavior. This is accomplished by a specific signal processor responsible for processing all timing critical operations within the tester.

The optical component tester according to the invention provides a less complex and less expensive measuring setup in comparison to those offering the same or similar measurement speed and or accuracy. Further more, the optical component tester according to the invention allows to provide an increased performance by offering a higher measurement speed and/or accuracy for characterizing modem optical components due to an improved matching of the functional units and the central controlling by the control unit. As well the setup and modifications of the tester as the processing and emission of triggering signals can be centrally handled by the control unit.

The invention further allows to provide the optical component tester as a turnkey solution with a "switch on ready to go" mode in comparison to the costly adjustment of individual components. Firmware and user interface can be adjusted to the respective application needs (usability). Additionally, the optical component tester allows to be integrated in one box providing an economic solution in terms of space and price.

The triggering of the functional units within the optical component tester and/or external devices can be accomplished by means of a flexible a trigger unit, which is preferably software controlled.

In preferred embodiments, the optical component tester comprises a wavemeter and/or an attenuator as functional units. By coupling an output of the tunable laser source directly to an input of the wavemeter and/or to an input of the attenuator, an output of the attenuator provides an improved external output for applying the stimulus signal to the optical component. An increased optical output power at the output and, in most cases, to a better performance of the laser stimulus can thus be achieved due to an increased power flatness versus wavelength with respect to a measuring setup comprising individual components as known in the art.

The tunable laser source is preferably embodied as a low noise tunable laser source as disclosed in the European Patent Application No. 97121649.4 by the, same applicant. Further more, the wavemeter is preferably embodied as a wavemeter disclosed in the European Patent Application No. 97107247.5 by the same applicarit, enabling fast stimulus response measurements with wavelength resolution <0.05 nm in combination with a high dynamic.

Further improvements can be achieved by loading (pre) calibration and/or setup data to the control unit, thus avoiding lengthy calibrations of the functional units, whereby the data is preferably stored and fetched on demand.

A stimulus and/or response wavelength sweep is preferably performed either in a linear wavelength mode by applying the wavemeter to ensure a linear wavelength tuning of the tunable laser source, or in a constant velocity mode by moving the tunable laser source from a first to a second wavelength, whereby the wavemeter measures the wavelength at each measuring point The latter mode is faster because there is no wavelength correction loop between the tunable laser source and the wavemeter needed.

It is clear that the tunable laser source can also be used as a source only independently of the response units.

BRIEF DESCRIPTION OF THE DRAWINGS

Other objects and many of the attendant advantages of the present invention will be readily appreciated and become better understood by reference to the following detailed description when considering in connection with the accompanied drawing in which.

DETAILED DESCRIPTION OF THE INVENTION

Figure 1:
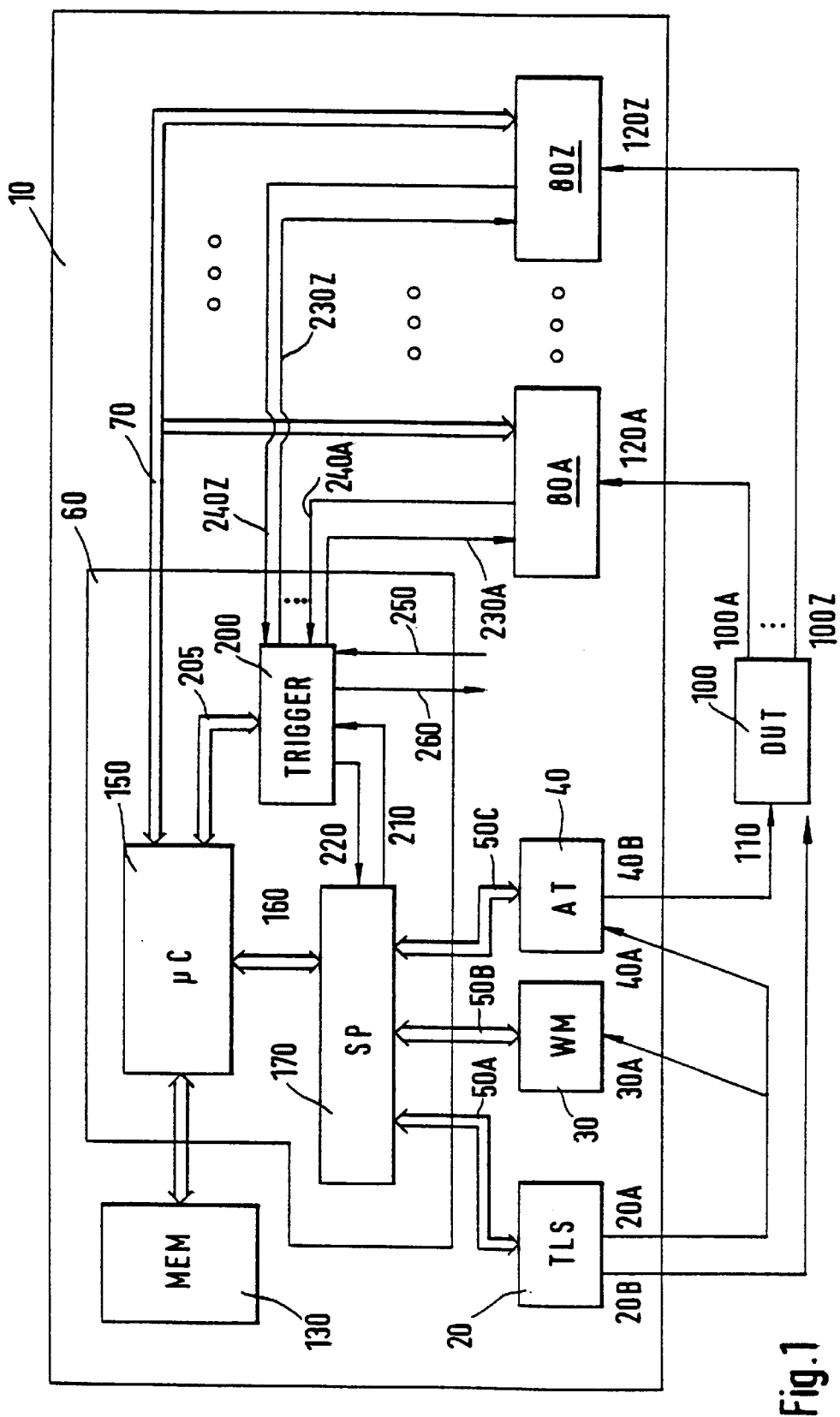
FIG. 1 shows a principal block diagram of an optical component tester according to the invention.

FIG. 1 shows a principal block diagram of an optical component tester 10 according to the invention. The optical component tester 10 comprises a tunable laser source (TLS) 20, a wavemeter (WM) 30, and an attenuator (AT) 40, each connected to a control unit 60 either via a general bus (not shown) or via separate data buses 50A, 50B, and 50C. The control unit 60 is connected to one or more responses units 80A . . . 80Z either via the general bus (not shown) or via a separate bus 70. The term bus as used herein may represent any kind of suitable connection as known in the art.

The control unit 60 controls the functioning of the functional units within the optical component tester 10 such as the tunable laser source 20, the wavemeter 30, the attenuator 40, and the response units 80A . . . 80Z. The control unit 60 further supports the communication between the functional units and provides information for the interaction of and between the functional units, such as setup or trigger information.

The architecture of the optical component tester 10 according to the invention, wherein each functional unit is connected to the control unit 60 via a bus, allows that all functional units can be embodied as (spatially) exchangeable modules, i.e. the location of each functional unit is not fixed. In case that the functional units exhibit the same outer dimensions, the location of e.g. the tunable laser source 20 can be exchanged with the location of the wavemeter 30, and vice versa. Further more, in case that more than one laser source is required, e.g. for applying the known time domain extinction (TDE) method for testing an erbium doped fiber amplifier (EDFA), one or more of the response units 80A . . . 80Z can be exchanged with additional laser sources. Accordingly, other additional functional units can thus be included.

It is to be understood that the wavemeter 30 and the attenuator 40 are not obligatory for the purpose of the invention but provide optional features either alone or in combination for preferred embodiments of the invention. For the sake of completeness, the invention shall be described in the following including the wavemeter 30 and the attenuator 40. However, in case that either the wavemeter 30 or the attenuator 40 or both are omitted, a correspondingly reduced functionality of the optical component tester 10 has to be encountered, e.g. linear wavelength operations (as will be explained later) cannot be performed or the power range cannot be influenced by the attenuator 40.

In operation for determining an optical characteristics of a device under test (DUT) 100, an output 20A of the tunable laser source 20 is connected with an input 30A of the wavemeter 30 and an input 40A of the attenuator 40. An output 40B of the attenuator 40 is connected to an input 110 of the DUT 100 for providing a stimulus signal thereto. The DUT 100 might provide one or more outputs 100A . . . 100Z, each one might be connected to a respective input 120A . . . 120Z of one of the response units 80A . . . 80Z. However, for other applications other connections might be required.

In a preferred embodiment, the output 20A of the tunable laser source 20 is directly coupled to the input 30A of the wavemeter 30 and to the input 40A of the attenuator 40, so that the output 40B of the attenuator 40 provides the only (external) output of the optical component tester 10 for applying the stimulus signal to the DUT 100.

In case that neither the wavemeter 30 nor the attenuator 40 is employed, the output 20A of the tunable laser source 20 provides the output for applying the stimulus signal to the DUT 100. In case that only the wavemeter 30 is employed, the wavemeter 30 provides an additional output (not shown) for applying the stimulus signal to the DUT 100.

In a preferred embodiment, a low noise tunable laser source as disclosed in the European Patent Application No. 97121649.4 by the same applicant is employed as the tunable laser source 20. That tunable laser source provides an optical resonator with a semiconductor and/or fibre amplifier for emitting a laser beam. A wavelength dependant mirror receives the laser beam and reflects back a wavelength separated laser beam. A beam splitter divides the wavelength separated laser beam into a feedback beam directed toward the amplifier and an output beam to be coupled out of the optical resonator of the tunable laser source. This output beam ('low noise output') provides an improved signal to noise ratio in particular with respect to an output beam ('high power output') which might be coupled out from the feedback beam after again passing the amplifier. However, the 'high power output' provides significantly more power than the 'low noise output'. The tunable laser source 20 can provide as well the 'low noise output' as the 'high power output'. Due to the reduced power level, the 'low noise output' is therefore preferably provided as an external output 20B to be directly connected to the DUT 100. The tuning at the tunable laser source 20 can then provided via the high power output 20A, so that the low noise output 20B reveals the same wavelength specification as the high power output 20A, however with a high signal purity (signal to total noise ratio).

It is to be understood that, in general, the tunable laser source 20 can provide more than one laser outputs and might thus have more than one internal outputs (to the wavemeter 30) or external outputs (to the DUT 100).

The wavemeter 30 is preferably embodied as a wavemeter disclosed in the European Patent Application No. 97107247.5 by the same applicant. That wavemeter comprises an optical component that generates an optical beam with a wavelength that depends on the optical power of the incident beam to be measured. A second measurement channel is provided in which the optical signals are retarded by $\pi/2$ relative to the optical signals in the first measurement channel. To obtain the desired retardation, either the first and second measurement channels each comprise a different etalon, or the wavemeter comprises a single retardation plate. After calibration of the wavemeter, the optical power of the beam generated by the optical component is measured. The measured value of the optical power is compared with the power values of the calibration data, and the wavelengths of the calibration data corresponding to the measured value of the optical power is determined. A controller, such as a PC, compares the measured wavelength with the desired wavelength and automatically adjusts the wavelengths of the signals generated by the laser source.

The preferred wavemeter 30 (according to the European Patent Application No. 97107247.5) for measuring a wavelength of a first optical beam comprises a first optical component which is arranged in said first optical beam or in apart of it and which generates a second optical beam with a first optical power, whereby said first optical power of said second optical beam depends on the wavelength of said first optical beam. A first power detector detects the optical power of said second optical beam and a first allocator allocates a wavelength to said detected first optical power based on the dependency of the optical power of said second optical beam which is generated by said first optical component on the wavelength of said first optical beam to be measured. A second optical component which is arranged in said first optical beam or in a part of it and which generates a third optical beam with a second optical power, whereby said second optical power of said third optical beam depends on the wavelength of said third optical beam. A second power detector detects said second optical power of said third optical beam, and a second allocator allocates a wavelength to said detected second optical power based on the dependency of said second optical power of said third optical beam which is generated by said second optical component on the wavelength of said first optical beam to be measured, The optical power generated by said first and second optical components oscillates periodically with increasing wavelength, and the third optical beam is retarded with respect to said second optical beam.

In order to improve the processing speed and the timing behavior, the control unit 60 might comprise a microcontroller ($\mu$pC) 150 connected via a bus 160 to a signal processor (SP) 170, whereby the signal processor 170 is connected via the buses 50A, 50B, and 50C to the tunable laser source 20, the wavemeter 30, and the attenuator 40. The micro-controller 150 is mainly responsible for providing the setup for the measurements, e.g. the setup of the tunable laser source 20 or the trigger setup, for processing the measuring results, and for providing a communication with external units. The signal processor 170, in contrast thereto, is mainly responsible for processing all timing critical operations, such as the precise tuning of the tunable laser source 20 or the precise time critical emission of triggering signals e.g. for the tunable laser source 20, the wavemeter 30, the attenuator 40, and the response units 80A . . . 80Z.

In an example, the microcontroller 150 first initiates a basic setup for a specific measurement, e.g. by providing data about a specific setting and/or calibration of the tunable laser source 20 in combination with the wavemeter 30 and the attenuator 40, so that a specific expected laser signal can be emitted to the OUT 100. In case the actually emitted laser signal deviates from the requested laser signal, the signal processor 170 will provide all means and measures or initiate the respective step for gaining the precise tuning of the tunable laser source 20. Further more, the signal processor 170 handles the precise time critical emission of triggering signals, so that each laser signals is emitted at a certain (requested) point of time and that each measuring result of the response units 80A . . . 80Z can be clearly assigned to a specific laser input signal for the DUT 100 at a certain wavelength determined by the wave meter 30.

In case that a wave meter as disdosed in the European Patent Application No. 97107247.5 is employed, the microcontroller 150 also supplies data about the expected wavelength to be measured as a start value to the wave meter 30.

The control unit 60 is preferably coupled with a memory 130 comprising stored (pre)calibration and/or setup data e.g. for the control unit 60, the signal processor 170, the trigger unit 200, the response units 80A . . . 80Z, and/or the whole setup of the optical component tester 10. In an example, the memory 130 comprises data about a power dependency of the tunable laser source 20 versus the wavelength and about the attenuation behavior of the wave meter 30 and/or attenuator 40 versus the wavelength. This data allows the control unit 60 to set up a prealibration of the tunable laser source 20 and the wave meter 30 in order to emit a laser signal at a specific wavelength and amplitude. A lengthy calibration step of the functional units can thus be reduced or even avoided.

To enable a fast wavelength tuning and control, the (pre)calibration data for the signal processor 170 can be loaded in a (not shown optional) memory of the signal processor 170, thus allowing a quicker response e.g. for setting and correcting the wavelength during the tuning of the tunable laser source 20.

The control unit 60 might further comprise a trigger unit (TRIGGER) 200 for emitting trigger signals for activating and initiating respective functionalities of the functional units, such as the tunable laser source 20, the wave meter 30, the attenuator 40, and the response units 80A . . . 80Z. The trigger unit 200 is therefore coupled via a bus 205 with the micro-controller 150, and thus, via the bus 160 to the signal processor 170 and via the bus 70 to the response units 80A . . . 80Z. The trigger unit 200 is preferably able to connect internal and/or external modules to each other and is preferably level or edge controlled.

The trigger unit 200 is preferably embodied in a way that substantially all functionality of the hardware components can be setup and modified by software means, so that the trigger unit 200 is programmable according to the actual demands. This can be accomplished e.g. by using field programmable gate arrays (FPGAs) exhibiting low costs and a low space demand.

In order to improve the timing of the trigger signals, the trigger unit 200 is preferably directly coupled to the signal processor 170 via a line 210 for receiving a control input signal from the signal processor 170 and via a line 220 for emitting a control output signal thereto. Accordingly, the trigger unit 200 is preferably further directly coupled to each one of the response units 80A . . . 80Z via a respective signal input line 230A . . . 230Z for emitting a trigger signal thereto, and via the respective one of the signal output lines 240A . . . 240Z for receiving a respective ready signal therefrom. Additionally, the trigger unit 200 might further comprise an external trigger input 250 and an external trigger output 260 for triggering external functional units such as sources, receivers, current sources, signal generators, or the like.

It is clear that the trigger unit 200 can also be coupled directly to the tunable laser source 20, the wave meter 30, and the attenuator 40, if required.

In a preferred embodiment, the trigger unit 200 is optimized for a fast hardware triggering which can be applied e.g. for the TDE method for testing EDFAs. The trigger unit 200 is capable to trigger multiple sources to switch on and off at the same time e.g. for supporting the TDE method by guaranteeing that delay times between the laser sources are in the range of microseconds or smaller.

Figure 2:
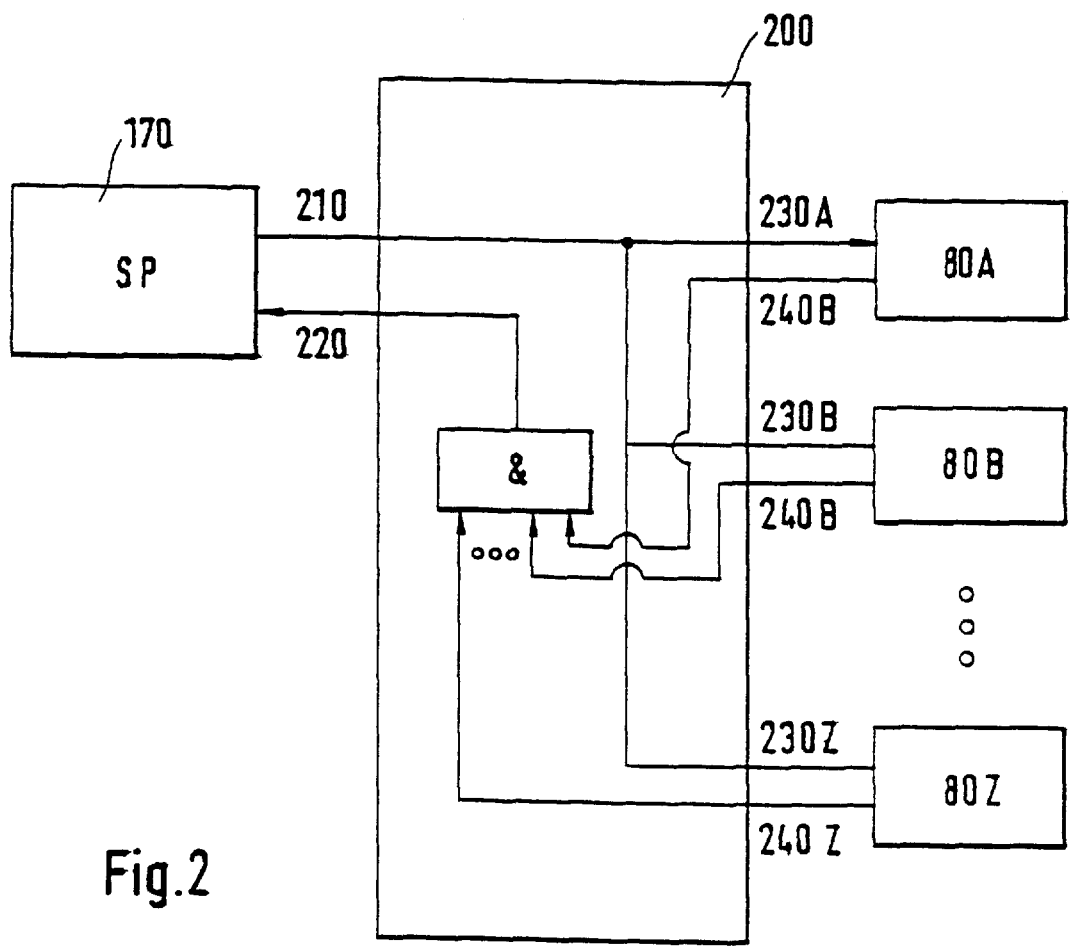
FIG. 2 shows an embodiment of the trigger unit 200.

FIG. 2 shows an example of an embodiment of the trigger unit 200 The control input signal 210 provided from the signal processor 170 for the trigger unit. 200 is coupled directly to each one of the signal input lines 85A . . . 85Z.

The signal output lines 90A . . . 90Z of each one of the response units 80A . . . 80Z is coupled to a respective input of a logic gate 250, an output thereof being coupled as the control output signal to line 220. In a preferred embodiment the gate 250 is an AND gate.

In operation, a linear wavelength operation of the optical component tester 10 is achieved by establishing a control loop between the tunable laser source 20 and the wave meter 30, whereby the output 20A of the tunable laser source 20 is connected to the input 30A of the wave meter 30. When the control unit 60 requests the tunable laser source 20 to emit a certain wavelength, the wave meter 30 measures the actually emitted wavelength and signals sent to the control unit 60. The control unit 60, in return, will set the tunable laser source 20 until the actually emitted wavelength equals the requested wavelength for increasing the setting up of the requested wavelength, the control unit 60 might fetch previously stored setup values of the tunable laser source 20 and the wave meter 30 from the memory 130.

In a preferred embodiment, the tuning of the laser source 20 is accomplished by a course wavelength movement performed by a wavelength motor and a fine wavelength tuning by varying the cavity length e.g. by a piezo tuning.

A fast stimulus and/or response wavelength sweep can be performed with the optical component tester 10 in a linear wavelength mode or in a constant velocity mode. In the linear wavelength mode, the wave meter 30 is applied to ensure a linear wavelength tuning of the tunable laser source 20, i.e. a linear move from a first to a second wavelength within a given deviation range, preferably over a plurality of equidistant (e.g. over the time and/or wavelength) wavelength values.

In the constant velocity mode, the tunable laser source 20 is moved from a first to a second wavelength, preferably over a plurality of wavelength values, whereby the wave meter 30 is used to measure the wavelength at each measuring point In contrast to the linear wavelength mode, the constant velocity mode normally requires a successive post processing in that the measuring data from the response units 80A. . . 80Z is combined with a respective wavelength value determined by the wave meter 30 for each measuring point.

The measuring speed, as well in the linear wavelength mode as in the constantvelocity mode, can be significantly improved by using wavelength (pre)calibration data, e.g. for correcting motor or piezo position during movement, which can be fetched preferably as data stored in the memory 130 or the optional memory of the signal processor 170.

In order to provide a fast wavelength measurement or sweep, the tunable laser source 20 should comprise a mode hop free tunable laser with a fine wavelength adjustment, and the wave meter 30 should comprise a fast wave meter as a sensor element.

Each one of the response units 80A . . . 80Z might comprise a powermeter and/or a wavelength selective powermeter, such as an optical spectrum analyzer, able to be controlled by software and hardware trigger signals.

What is claimed is:

1. An optical component tester for determining wavelength dependent characteristics of an optical component, comprising:
   as functional units:
      a tunable laser source for providing a stimulus signal to the optical component, and
      one or more response units for receiving a response of the optical component to the stimulus signal; and
   a control unit coupled to the functional units for controlling the functioning thereof,
   characterized in that:
      the control unit comprises a signal processor connected to the functional units and is responsible for processing timing critical operations within the tester.

2. The optical component tester of claim 1, wherein the control unit further provides the communication between the functional units and information for the interaction between the functional units.

3. The optical component tester of claim 1, wherein the control unit further comprises a microcontroller connected to the signal processor.

4. The optical component tester according to claim 1, wherein the control unit comprises a trigger unit for emitting trigger signals for activating the functional units.

5. The optical component tester of claim 4, wherein the trigger unit is coupled to at least one of the signal processor or the functional units for receiving a control input signal therefrom and for emitting a control output signal thereto.

6. The optical component tester according to claim 1, further comprising as functional units at least one of a wave meter or an attenuator.

7. The optical component tester of claim 6, wherein an output of the tunable laser source is directly coupled to an input of the wavemeter or to an input of the attenuator, as the case may be, and an output of the attenuator provides an external output of the optical component tester for applying the stimulus signal to the optical component.

8. The optical component tester of claim 6, wherein the tunable laser source comprises an optical resonator with a semiconductor or fiber amplifier for emitting a laser beam, a wavelength dependent mirror for receiving the laser beam and reflecting back a wavelength separated laser beam, and a beam splitter for dividing the wavelength separated laser beam into a feedback beam directed toward the amplifier and a first output beam to be coupled out of the optical resonator of the tunable laser source.

9. The optical component tester according to claim 6, wherein the wave meter for measuring a wavelength of a first optical beam comprises:
   a first optical component which is arranged in said first optical beam or in a part of it and which generates a second optical beam with a first optical power, whereby said first optical power of said second optical beam depends on the wavelength of said first optical beam,
   a first power detector detecting the optical power of said second optical beam,
   a first allocator allocating a wavelength to said detected first optical power based on the dependency of the optical power of said second optical beam which is generated by said first optical component on the wavelength of said first optical beam to be measured,
   a second optical component which is arranged in said first optical beam or in a part of it and which generates a third optical beam with a second optical power, whereby said second optical power of said third optical beam depends on the wavelength of said third optical beam,
   a second power detector detecting said second optical power of said third optical beam, and
   a second allocator allocating a wavelength to said detected second optical power based on the dependency of said second optical power of said third. optical beam which is generated by said second optical component on the wavelength of said first optical beam to be measured, whereby said optical power generated by said first and second optical components oscillate periodically with increasing wavelength, and said third optical beam being retarded with respect to said second optical beam.

10. The optical component tester according to claim 1, wherein the control unit is coupled with a memory comprising stored calibration, precalibration and/or setup data.

11. A method for determining the wavelength dependent characteristics, of an optical component, comprising:

provided a stimulus signal to the optical component, receiving a response of the optical component to the stimulus signal, and controlling the provision of the stimulus signal and the receiving of the response on the stimulus signal by dividing the operations within a tester in timing critical and timing non-critical operations, wherein the stimulus signal is triggered by a signal processor and calibration data for the signal processor is loaded in a memory unit of the signal processor.

12. A method for determining the wavelength dependent characteristics of an optical component, comprising:

providing a stimulus signal to the optical component, receiving a response of the optical component to the stimulus signal, and controlling the provision of the stimulus signal and the receiving of the response on the stimulus signal by dividing the operations within a tester in timing critical and timing non-critical operations, further comprising wherein a stimulus or response wavelength sweep is performed: in a linear wavelength mode by applying a wave meter to ensure a linear wavelength tuning of a tunable laser source, or in a constant velocity mode by moving a tunable laser source from a first to a second wavelength, whereby a wave meter measures the wavelength at each measuring point.

13. A method for determining the wavelength dependent characteristics of an optical component according to claim 11, wherein a control unit comprising a signal processor controls the provision of the stimulus signal and the receiving of the response on the stimulus signal.

14. A method for determining the wavelength dependent characteristics of an optical component according to claim 11, wherein a tunable laser source provides the stimulus signal.

15. A method for determining the wavelength dependent characteristics of an optical component according to claim 11, wherein one or more response units receive the response of the optical component to the stimulus signal.

16. A method for determining the wavelength dependent characteristics of an optical component, comprising:

providing a stimulus signal to the optical component, receiving a response of the optical component to the stimulus signal, and controlling the provision of the stimulus signal and the receiving of the response on the stimulus signal by dividing the operations within a tester in timing critical and timing non-critical operations, wherein a control unit comprises a trigger unit for emitting trigger signals to control a provision of stimulus signals and the receiving of the response on the stimulus signals.

17. A method for determining the wavelength dependent characteristics of an optical component according to claim 16, wherein the trigger unit is coupled to a signal processor or tunable laser source.

18. A method for determining the wavelength dependent characteristics of an optical component comprising:

providing a tunable laser source for providing a stimulus signal to the optical component;

providing one or more response units for receiving a response of the optical component to the stimulus signal;

providing a control unit coupled to the tunable laser source and one or more response units for controlling the functioning;

wherein the control unit comprises a signal processor connected to the tunable laser source and the one or more response units, the signal processor responsible for processing timing critical operations of the tunable laser source and the one or more response units.

19. A method for determining the wavelength dependent characteristics of an optical component according to claim 18, wherein the control unit further provides communication between the tunable laser source and the one or more response units, and information for the interaction between the tunable laser source and the one or more response units.

* * * * *